(12) United States Patent
Smith

(10) Patent No.: US 9,320,204 B2
(45) Date of Patent: Apr. 26, 2016

(54) SOAKER HOSE WITH SCALABLE PERMEABLE SURFACE AREA AND METHOD

(71) Applicant: Kevin Lee Smith, Webster, TX (US)

(72) Inventor: Kevin Lee Smith, Webster, TX (US)

(*) Notice: Subject to any disclaimer, the term of this patent is extended or adjusted under 35 U.S.C. 154(b) by 175 days.

(21) Appl. No.: 14/249,438

(22) Filed: Apr. 10, 2014

(65) Prior Publication Data

US 2016/0073595 A1   Mar. 17, 2016

Related U.S. Application Data

(60) Provisional application No. 61/820,525, filed on May 7, 2013.

(51) Int. Cl.
| | | |
|---|---|---|
| *B05B 15/00* | (2006.01) | |
| *A01G 25/02* | (2006.01) | |
| *B05B 1/28* | (2006.01) | |
| *B05B 9/04* | (2006.01) | |
| *B05B 1/16* | (2006.01) | |
| *B05B 1/30* | (2006.01) | |
| *B05B 1/26* | (2006.01) | |
| *B05B 15/06* | (2006.01) | |
| *B05B 1/04* | (2006.01) | |
| *B05B 1/20* | (2006.01) | |

(52) U.S. Cl.
CPC .............. *A01G 25/02* (2013.01); *A01G 25/023* (2013.01); *B05B 1/044* (2013.01); *B05B 1/046* (2013.01); *B05B 1/16* (2013.01); *B05B 1/1672* (2013.01); *B05B 1/20* (2013.01); *B05B 1/26* (2013.01); *B05B 1/267* (2013.01); *B05B 1/28* (2013.01); *B05B 1/3006* (2013.01); *B05B 1/3013* (2013.01); *B05B 9/0423* (2013.01); *B05B 15/00* (2013.01); *B05B 15/001* (2013.01); *B05B 15/069* (2013.01)

(58) Field of Classification Search
CPC .... A01G 25/02; A01G 25/023; B05B 9/0423; B05B 15/001; B05B 1/28; B05B 15/00; B05B 1/16; B05B 1/26; B05B 1/267; B05B 15/069; B05B 1/3013; B05B 1/1672; B05B 1/20; B05B 1/046; B05B 1/044; B05B 1/3006
USPC ........ 239/76, 145, 288–288.5, 289, 436, 461, 239/505–507, 542, 547, 562–564, 566–568, 239/570
See application file for complete search history.

(56) References Cited

U.S. PATENT DOCUMENTS

| | | | | |
|---|---|---|---|---|
| 3,698,195 | A * | 10/1972 | Chapin ................. | A01G 25/02 239/542 |
| 3,899,135 | A * | 8/1975 | O'Brian .............. | A01G 25/023 239/562 |
| 4,452,397 | A * | 6/1984 | Barton ................. | A01G 25/09 239/547 |
| 5,129,758 | A * | 7/1992 | Lindstrom ............ | A01G 25/06 239/570 |

* cited by examiner

*Primary Examiner* — Steven J Ganey
(74) *Attorney, Agent, or Firm* — Dave Alan Lingbeck

(57) ABSTRACT

A soaker hose with scalable permeable surface area and method for selecting and controlling which areas to be watered. The soaker hose with scalable permeable surface area and method includes a hose having a wall with a plurality of perforations disposed about and through the wall and along the length of the hose and also having ends and a passageway extending though the length of the hose and through the ends, for moving water to specified locations; and a sheathing arrangement including at least one sleeve movably disposed about the hose to prevent the water exiting through the perforations which are covered by the at least one sleeve.

11 Claims, 4 Drawing Sheets

SOAKER HOSE WITH SCALABLE PERMEABLE SURFACE AREA AND METHOD

CROSS-REFERENCE TO RELATED APPLICATIONS

The present application claims the benefit of the U.S. provisional application Ser. No. 61/820,525, filed on May 7, 2013, the disclosure of which is expressly incorporated by reference herein in its entirety.

BACKGROUND OF THE INVENTION

1. Field of the Invention

The present invention relates to soaker hoses and more particularly pertains to a new soaker hose with scalable permeable surface area and method for selecting and controlling which areas to be watered.

2. Description of the Prior Art

The use of soaker hoses is known in the prior art. More specifically, soaker hoses heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a flexible irrigation pipe including porous and non-porous segments combined together to avoid unnecessary water loss and improve water distribution along the porous segments of the irrigation pipe. Another prior art includes an irrigation assembly that comprises a soaker hose having a liquid permitting region and a liquid barrier, which preferably is a tube that is disposed concentrically about a portion of said liquid permitting region and is axially movable relative thereto. The tube is water-impermeable such that water flowing through the soaker hose is not permitted to exit the hose along the axial region of the liquid permitting portion that is covered by the tube. Also another prior art includes a porous pipe having a porosity which varies continuously and controllably with length is produced by extruding a mixture of particles of pre-vulcanized elastomer such as reclaimed crumb rubber and a thermoplastic binder such as polyethylene with all parameters controlled except for die temperature of pull-off rate. By gradually varying temperature or pull-off rate during extrusion, the porosity of the pipe gradually changes. The leak rate can be controlled in a manner to produce a length of porous pipe in which the leak rate is constant as the pressure drops over the length of the pipe. While these devices fulfill their respective, particular objectives and requirements, the aforementioned patents do not disclose a new soaker hose with scalable permeable surface area and method.

SUMMARY OF THE INVENTION

The general purpose of the present invention, which will be described subsequently in greater detail, is to provide a new soaker hose with scalable permeable surface area and method which has many of the advantages of the soaker hoses mentioned heretofore and many novel features that result in a new soaker hose with scalable permeable surface area and method which is not anticipated, rendered obvious, suggested, or even implied by any of the prior art soaker hoses, either alone or in any combination thereof. The present invention includes a hose having a wall with a plurality of perforations disposed about and through the wall and along the length of the hose and also having ends and a passageway extending though the length of the hose and through the ends, for moving water to specified locations; and a sheathing arrangement including at least one sleeve movably disposed about the hose to prevent the water exiting through the perforations which are covered by the at least one sleeve. None of the prior art includes the combination of the elements of the present invention.

There has thus been outlined, rather broadly, the more important features of the soaker hose with scalable permeable surface area and method in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new soaker hose with scalable permeable surface area and method which has many of the advantages of the soaker hoses mentioned heretofore and many novel features that result in a new soaker hose with scalable permeable surface area and method which is not anticipated, rendered obvious, suggested, or even implied by any of the prior art soaker hoses, either alone or in any combination thereof.

Still another object of the present invention is to provide a new soaker hose with scalable permeable surface area and method for selecting and controlling which areas to be watered.

Still yet another object of the present invention is to provide a new soaker hose with scalable permeable surface area and method that compresses and blocks the perforations through the wall of selected portions of the soaker hose to prevent water coming out of those selected portions.

Even still another object of the present invention is to provide a new soaker hose with scalable permeable surface area and method that reduces water runoff, water usage, and energy usage in ground water pumps.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
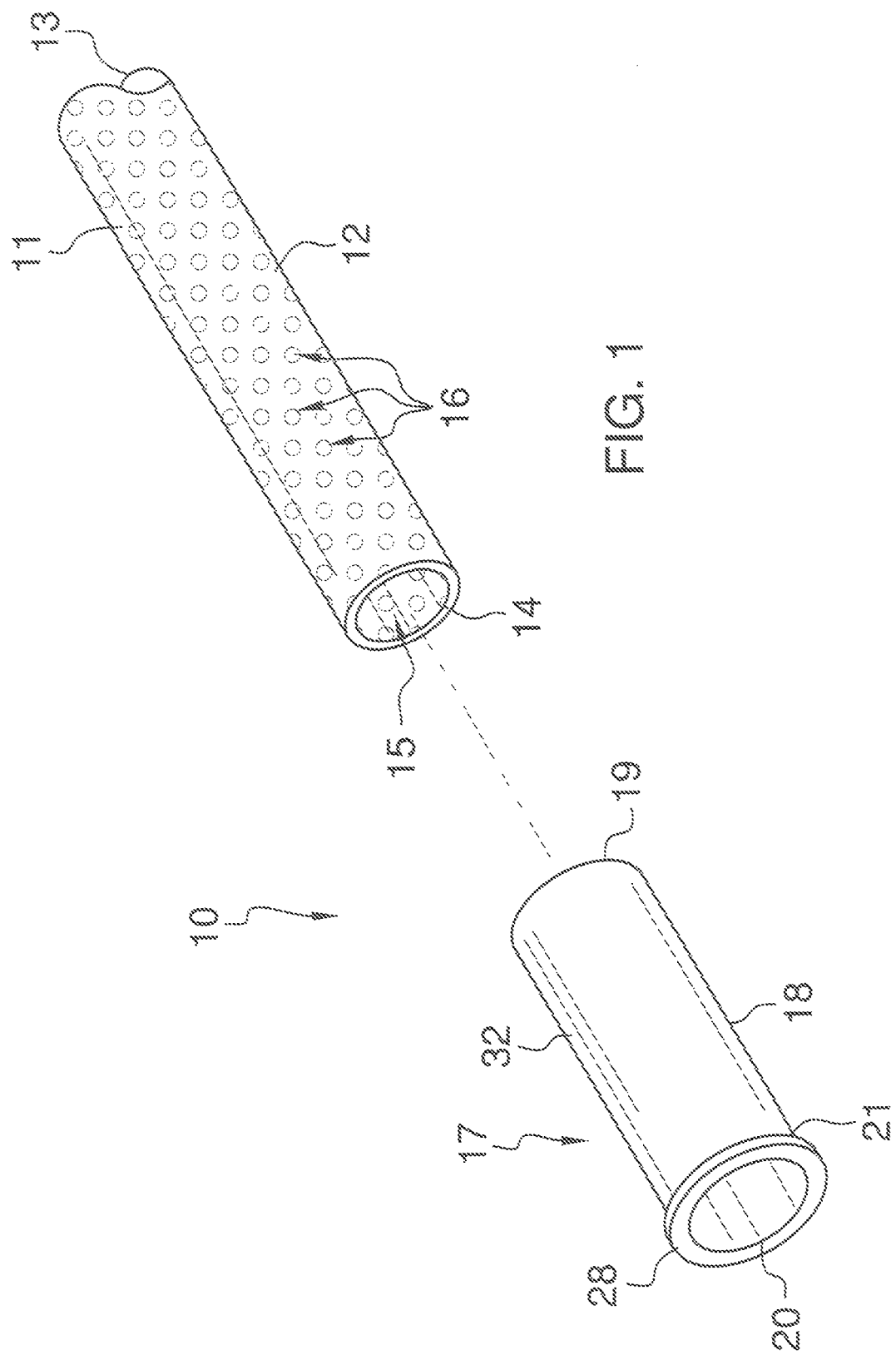
FIG. 1 is an exploded perspective view of the soaker hose with scalable permeable surface area

With reference now to the drawings, and in particular to FIGS. 1 through 5 thereof, a new soaker hose with scalable permeable surface area and method embodying the principles and concepts of the present invention and generally designated by the reference numeral 10 will be described.

As best illustrated in FIGS. 1 through 5, the soaker hose with scalable permeable surface area and method 10 may generally comprise a hose 11 made of suitable material such as nylon or rubber and having a wall 12 with a plurality of perforations 16 disposed about and through the wall 12 and along the length of the hose 11 and also having ends 13, 14 and a passageway 15 extending though the length of the hose 11 and through the ends 13, 14 and used for moving water to specified locations for irrigating selected areas of ground, and may also comprise a sheathing arrangement 17 including at least one sleeve 18, 23 movably disposed about the hose 11 to prevent the water exiting through the perforations 16 which are covered by the at least one sleeve 18, 23.

Figure 2:
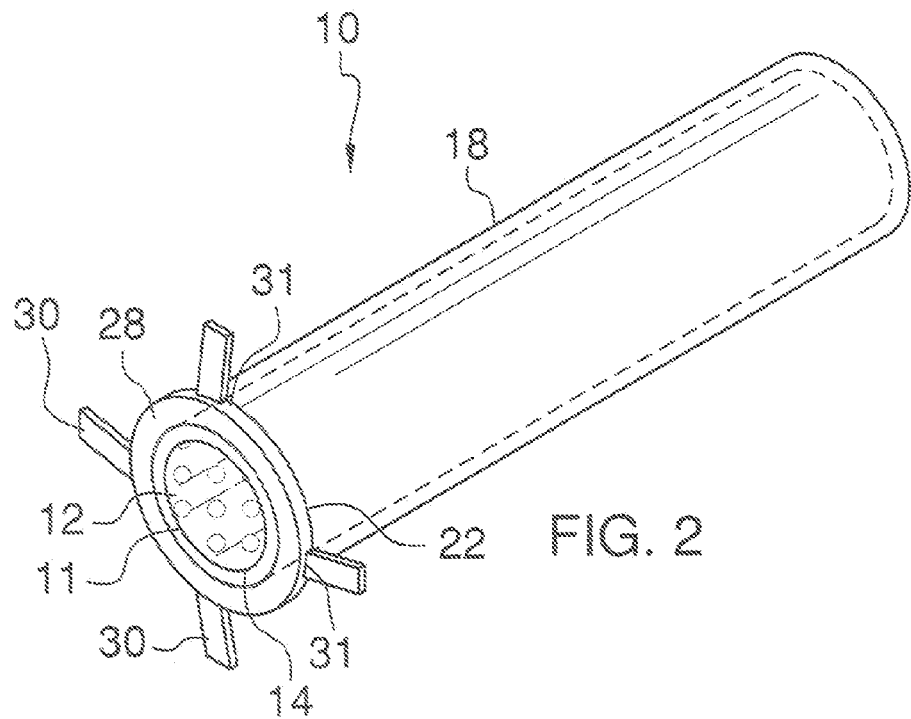
FIG. 2 is a perspective view of the section of the soaker hose with scalable permeable surface area

As shown in FIG. 2, the at least one sleeve 18, 23 includes a sleeve 18 having a wall 32 made of an impermeable, elastic and compressive material such as rubber or the like. The sleeve 18 applies sufficient compressive pressure on and compresses a selected portion of the hose 11 to block the covered perforations 16 when the sleeve 18 is disposed about the hose 11. The sleeve 18 has a selected length and is arranged to envelope about at least a selected portion of the hose 11 to prevent water exiting the covered perforations 16. The sleeve 18 has opposed ends 19, 20 and is pullable and/or rollable onto itself from at least one of the opposed ends 19, 20 to uncover selected portions of the hose 11 to allow water to exit through the uncovered perforations 16 with the other one of the ends 19, 20 possibly being conventionally sealed or adhered to the hose 11. As another embodiment, the sleeve 18 may be severable and removable along selected lengths thereof to expose desired portions of the hose 11.

Figure 3:
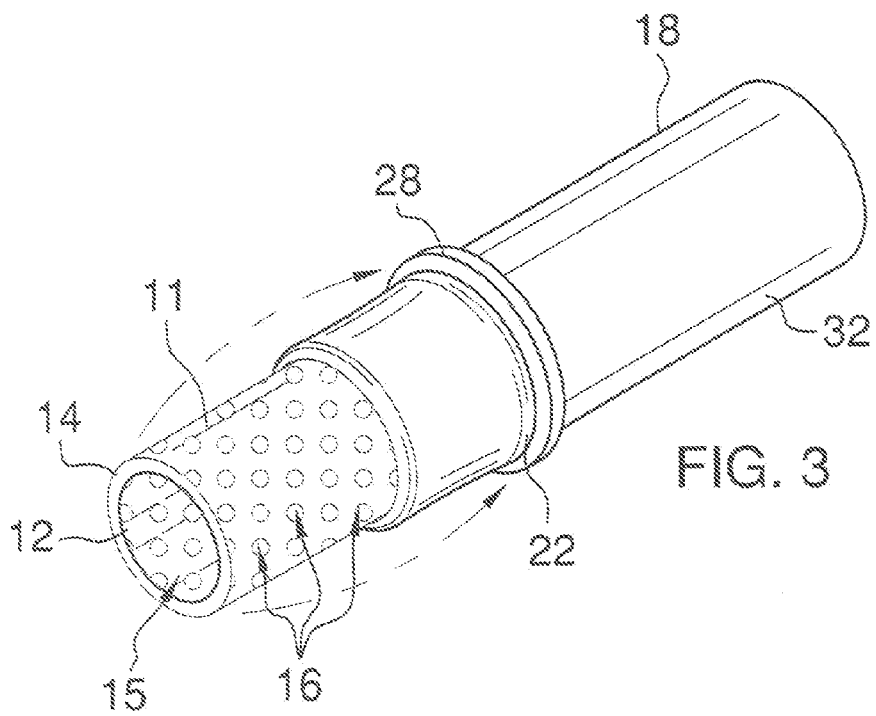
FIG. 3 is a perspective view of another embodiment of the soaker hose with scalable permeable surface area

As illustrated in FIGS. 1 through 3, the sheathing arrangement 17 may also include a ring member 28 made of any suitable material such a rubber, plastic or material with the ring member 28 securely and conventionally disposed about the sleeve 18 at one of the ends 19, 20 for a user to effectively grasp with one's hand and roll the ring member 28 and the sleeve 18 onto itself to expose a selected portion of the hose 11 for water to exit through the exposed perforations 16. The ring member 28 may have any desired thickness and width that would allow the ring member 28 to roll with the sleeve 18. The sleeve 18 may have an end portion 21 which terminates in an endless tubular cuff 22 disposed circumferentially about the sleeve 18 with the ring member 28 being retained in the endless tubular cuff 22. In addition, the sheathing arrangement 17 may also includes tab members 30 spacedly disposed about the ring member 28 including a clamp and having ends 31 conventionally attached to the ring member 28 for the user to grasp, pull and roll the sleeve 18 onto itself to expose a portion of the hose 11.

Figure 4:
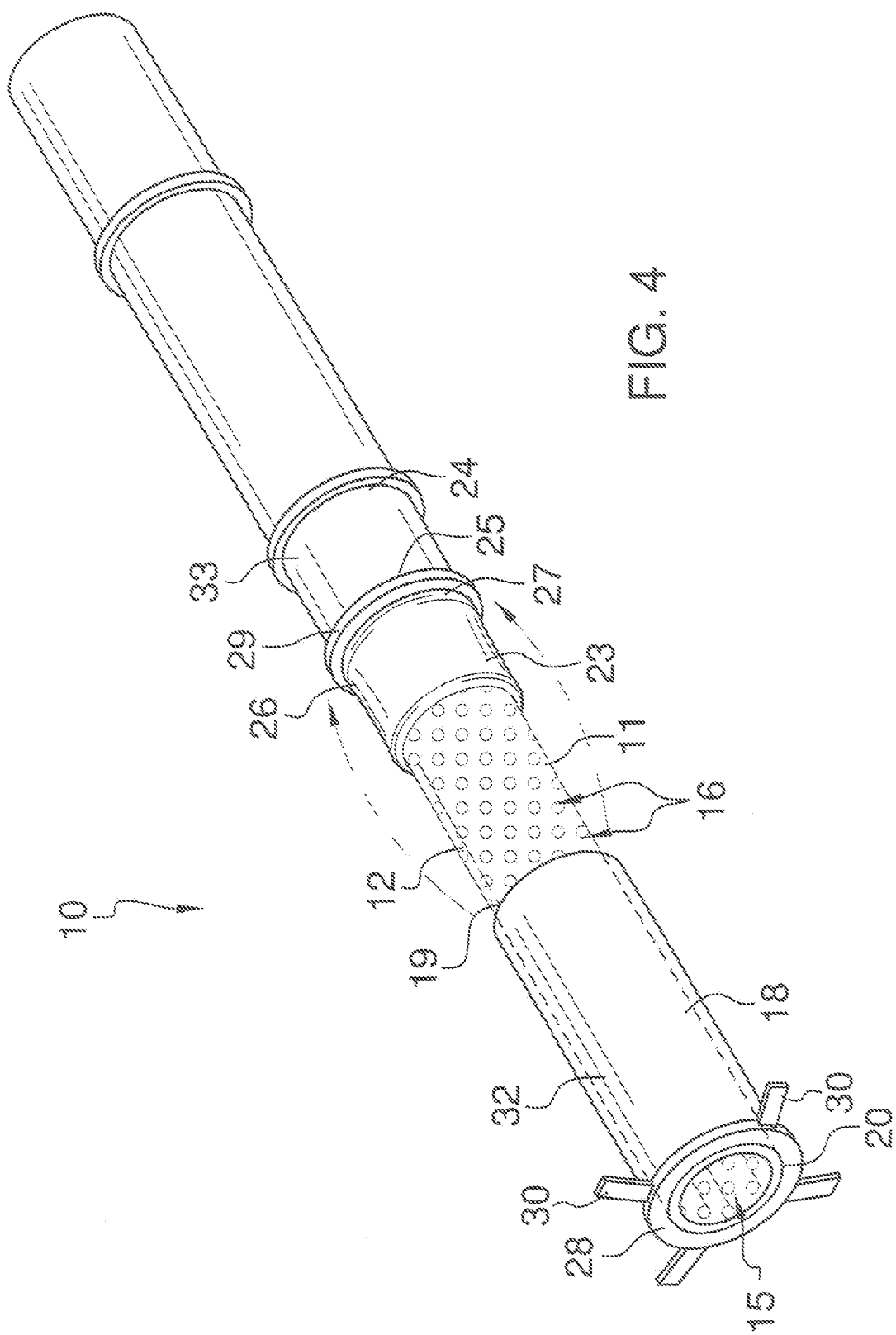
FIG. 4 is a perspective view of yet another embodiment of the soaker hose with scalable permeable surface area.

As shown in FIG. 4, the sheathing arrangement 17 may include a plurality of sleeves 18, 23 arranged end to end about the hose 11 to block the covered perforations 16. Each of the sleeves 18, 23 has a wall 32, 33 made of impermeable, elastic and compressive material such as rubber to substantially prevent water to exit through the covered perforations 16. Each of the sleeves 18, 23 has opposed ends 19, 20, 24, 25 and is pullable and/or rollable onto itself from at least one of the opposed ends 19, 20, 24, 25 to expose at least a portion of the hose 11 so that water can exit through the exposed perforations 16. As another embodiment, each of the sleeves 18, 23 is severable and removable along selected lengths thereof to expose desired portions of the hose 11.

The sheathing arrangement 17 may also include a plurality of ring members 28, 29 each made of a suitable material such as rubber, plastic or metal and being securely and conventionally disposed about a respective sleeve 18, 23 at one of the ends 19, 20, 24, 25 for the user to grasp and roll the respective ring member 28, 29 and the respective sleeve 18, 23 onto itself to expose a selected portion of the hose 11 as desired for water to exit through the exposed perforations 16. Each of the sleeves 18, 23 may also have an end portion 21, 26 which terminates in an endless tubular cuff 22, 27 disposed circumferentially about the respective sleeve 18, 23 with a respective ring member 28, 29 being retained in the endless tubular cuff 22, 27. The sheathing arrangement 17 may further include tab members 30 spacedly disposed about the ring members 28, 29 including clamps and having ends 31 securely and conventionally attached to the ring members 28, 29 for the user to grasp, pull and roll each of the sleeves 18, 23 onto itself to expose a respective portion of the hose 11.

Figure 5:
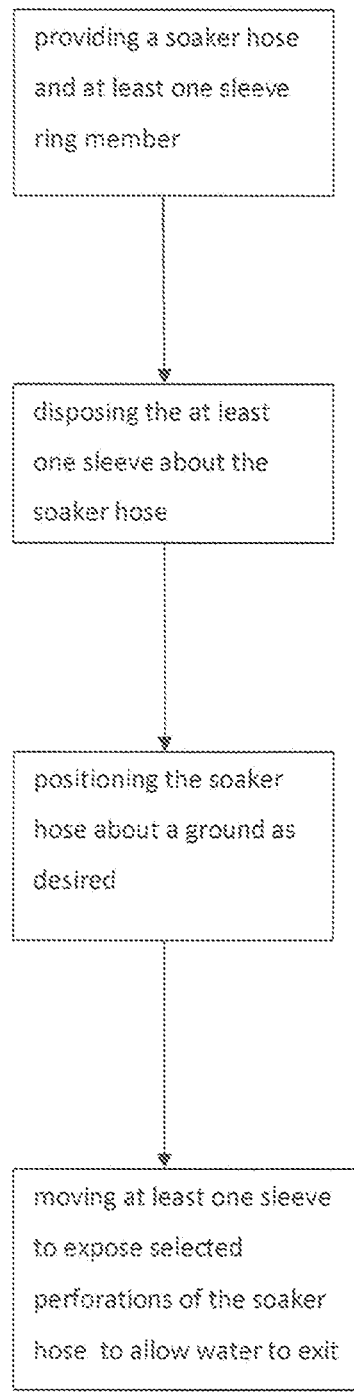
FIG. 5 is a flow diagram of the use of the soaker hose with scalable permeable surface area.

In use as shown in FIG. 5, the at least one sleeve 18, 23 or a plurality of the sleeves may be compressively disposed about the hose 11 to sufficiently compress the hose 11 and cover a selection of the perforations 16 to prevent water exiting the covered perforations 16. The hose 11 may then be positioned as desired about a ground either upon or in the ground. The user may desire to irrigate selected areas of the ground by moving the at least one sleeve 18, 23 to expose at least a selected portion of the hose 11 for water to exit and to soak a selected area of the ground. The user may roll the at least one sleeve 18, 23 back upon itself from at least one end 19, 20, 24, 25 thereof to expose a selected portion of the hose 1 so that water can exit the uncovered perforations 16. The user may do this by grasping the ring member 28 and roll the sleeve 18 back upon itself from the end 19, 20 of the sleeve 18 to expose a selected portion of the hose 11. If the hose 11 is covered with a plurality of sleeves 18, 23, the user can select which areas of ground to irrigate by rolling back one or more of the sleeves 18, 23 upon itself to expose selected portions of the hose 11 through which water exits the exposed perforations 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the soaker hose with scalable permeable surface area and method. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A soaker hose with scalable permeable surface area comprising:
   a hose having a wall with a plurality of perforations disposed about and through the wall and along the length of the hose and also having ends and a passageway extending though the length of the hose and through the ends, for moving water to specified locations; and
   a sheathing arrangement including at least one sleeve movably disposed about the hose to prevent the water exiting through the perforations which are covered by the at least one sleeve, wherein the at least one sleeve includes a sleeve having a wall made of an impermeable, elastic and compressive material, wherein the sleeve applies sufficient compressive pressure on and compresses a selected portion of the hose when the sleeve is disposed about the hose to block the covered perforations, wherein the sleeve has a selected length and is arranged to envelope about at least a selected portion of the hose to prevent water exiting the covered perforations, wherein the sleeve has opposed ends and is movable onto itself from at least one of the opposed ends to uncover selected portions of the hose to allow water to exit through the perforations uncovered.

2. The soaker hose with scalable permeable surface area as described in claim 1, wherein the sheathing arrangement includes a ring member securely disposed about the sleeve at one of the ends for a user to grasp the ring member and move the sleeve onto itself and about the ring member to expose a selected portion of the hose for water to exit through the perforations exposed.

3. The soaker hose with scalable permeable surface area as described in claim 2, wherein the sleeve has an end portion which terminates in an endless tubular cuff disposed circumferentially about the sleeve with the ring member being retained in the endless tubular cuff.

4. The soaker hose with scalable permeable surface area as described in claim 2, wherein the sheathing arrangement also includes tab members spacedly disposed about the ring member and having ends attached to the ring member, for the user to grasp, pull the sleeve onto itself to expose a portion of the hose.

5. A soaker hose with scalable permeable surface area comprising:
   a hose having a wall with a plurality of perforations disposed about and through the wall and along the length of the hose and also having ends and a passageway extending though the length of the hose and through the ends, for moving water to specified locations; and
   a sheathing arrangement including at least one sleeve movably disposed about the hose to prevent the water exiting through the perforations which are covered by the at least one sleeve, wherein the sheathing arrangement includes a plurality of sleeves arranged end to end about the hose to block the covered perforations, wherein each of the sleeves has a wall made of impermeable, elastic and compressive material to substantially prevent water to exit through the covered perforations, wherein each of the sleeves has opposed ends and is movable onto itself from at least one of the opposed ends to expose at least a portion of the hose so that water can exit through the perforations exposed.

6. The soaker hose with scalable permeable surface area as described in claim 5, wherein the sheathing arrangement includes a plurality of ring members each securely disposed about a respective sleeve at one of the ends for a user to grasp and move the respective ring member and the respective sleeve onto itself to expose a selected portion of the hose for water to exit through the exposed perforations.

7. The soaker hose with scalable permeable surface area as described in claim 6, wherein each of the sleeves has an end portion which terminates in an endless tubular cuff disposed circumferentially about the respective sleeve with a respective ring member being retained in the respective endless tubular cuff.

8. The soaker hose with scalable permeable surface area as described in claim 6, wherein the sheathing arrangement also includes tab members spacedly disposed about the ring members and having ends attached to the ring members, for the user to grasp, pull and move each of the sleeves onto itself to expose a portion of the hose.

9. A method of using a soaker hose with a sheathing arrangement comprising the steps of:
   providing a hose with perforations and providing at least one sleeve made of impermeable and compressive material;
   disposing the at least one sleeve about the hose to sufficiently compress the hose and cover a selection of the perforations to prevent water exiting the covered perforations;
   positioning the hose about a ground; and
   moving the at least one sleeve to expose at least a selected portion of the hose for water to exit and to soak a selected area of the ground and rolling the at least one sleeve back upon itself from at least one end thereof to expose a selected portion of the hose so that water can exit the perforations uncovered.

10. The method of using a soaker hose with a sheathing arrangement as described in claim 9, wherein the providing at least one sleeve includes providing a ring member secured at an end of the sleeve.

11. The method of using a soaker hose with a sheathing arrangement as described in claim 10, wherein the moving the at least one sleeve includes grasping the ring member and moving the ring member and the sleeve back upon itself from the end of the sleeve to expose a selected portion of the hose.

* * * * *